(12) United States Patent
Millman

(10) Patent No.: US 6,203,019 B1
(45) Date of Patent: Mar. 20, 2001

(54) MACHINE AND METHOD FOR PREVENTING FLANGE LEAKAGE

(75) Inventor: Jeffrey Charles Millman, Ontario (CA)

(73) Assignee: The Babcock & Wilcox Company, New Orleans, LA (US)

(*) Notice: Subject to any disclaimer, the term of this patent is extended or adjusted under 35 U.S.C. 154(b) by 0 days.

(21) Appl. No.: 09/281,891

(22) Filed: Mar. 31, 1999

(51) Int. Cl.[7] ............................................. F16J 3/00
(52) U.S. Cl. ........................ 277/315; 277/634; 277/637
(58) Field of Search ............................ 277/315, 634, 277/637

(56) References Cited

U.S. PATENT DOCUMENTS

| | | | |
|---|---|---|---|
| 2,841,984 | * | 7/1958 | Green . |
| 3,458,683 | * | 7/1969 | Canonico et al. . |
| 3,825,712 | * | 7/1974 | Gibbs ................................. 219/137 |
| 4,046,010 | * | 9/1977 | Akeley ................................. 73/406 |
| 4,135,603 | * | 1/1979 | Doyle, Jr. ............................. 92/98 R |
| 4,254,322 | * | 3/1981 | Asano ................................. 219/122 |
| 4,265,389 | * | 5/1981 | Mastromatteo ..................... 228/219 |
| 5,230,248 | * | 7/1993 | Cucci et al. ......................... 73/706 |
| 5,711,343 | * | 1/1998 | Beckett .............................. 137/512.1 |
| 6,038,961 | * | 3/2000 | Filippi et al. ......................... 92/98 R |

\* cited by examiner

*Primary Examiner*—Anthony Knight
*Assistant Examiner*—Alison K. Pickard
(74) *Attorney, Agent, or Firm*—R. J. Edwards; E. Marich

(57) ABSTRACT

A diaphragm weld assembly for preventing fluid leakage from a flange. The diaphragm weld assembly has a flange having a platform, the platform having an opening and an annular weld pocket concentric with the opening, a diaphragm resting on the platform and having a ring extending from the bottom face of the diaphragm, the ring engaging with the opening, a weld bead formed in the annular weld pocket and welding the diaphragm to the flange, and a flange cover fastened to the flange. A method of creating the diaphragm weld assembly is also provided.

16 Claims, 1 Drawing Sheet

MACHINE AND METHOD FOR PREVENTING FLANGE LEAKAGE

FIELD AND BACKGROUND OF THE INVENTION

1. Field of the Invention

The present invention relates generally to a machine and method for preventing fluid leakage from a flange, in particular, to a new and useful flange seal utilizing a seal welded diaphragm.

2. Description of the Related Art

Conventional flange connections are sealed by gaskets. Fluid leakage can occur on these flange connections after long-term service. Flange leakage is caused by displacement deformation of the gasket weld pockets on the flange and general wear and erosion on the gasket sealing surface.

SUMMARY OF THE INVENTION

It is an object of the present invention to provide a new and improved machine and method for preventing fluid leakage from a flange.

The diaphragm seal assembly consists of a flange with a platform which has an opening. An annular weld pocket is located on the platform concentric with the opening. A diaphragm with a top face and a bottom face rests on the flange platform. A ring extends from the bottom face of the diaphragm and engages with the opening on the flange platform. A weld bead is formed in the annular groove and the diaphragm is seal welded to the weld bead on the flange platform. A flange cover is fastened to the flange.

The present invention has several advantages over known flange seal assemblies.

The present invention allows for clear access to the diaphragm for welding and NDE (PT) or penetrant testing of the weld bead.

The annular weld pocket allows for removal and re-welding of the diaphragm during inspection outages without pre-heat or post weld heat treatment.

The present invention further allows for a temper-bead technique in accordance with Section III, Div. 1, NB-4622.11 of the ASME Code to weld buildup the annular weld pocket, thus eliminating the need for a field post weld heat treatment.

The diaphragm may be formed of Alloy 690 which has a high mechanical strength and a superior fatigue resistance as compared to carbon and low alloy steels. Alloy 690 further has a coefficient of thermal expansion compatible with ordinary steel, the material generally used for flanges, and thus minimizes thermally induced stress in the seal weld.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
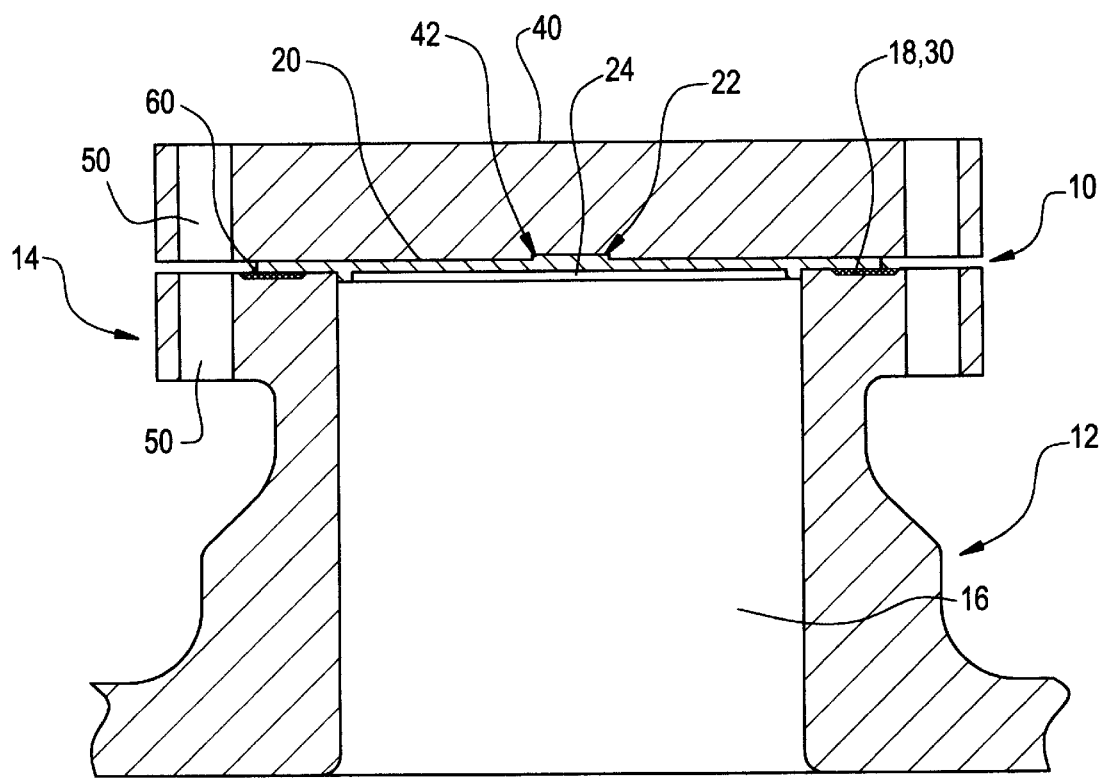
FIG. 1 is a cross-sectional view of the diaphragm seal assembly.

Referring now to FIG. 1, in which like reference numerals are used to refer to the same or similar elements, diaphragm seal assembly 10 is used in combination with flange 12 having platform 14. Platform 14 has opening 16 and annular weld pocket 18 concentric with opening 16.

Diaphragm 20 rests on platform 14. Key 22 extends upward from top surface of diaphragm 20. Weld bead 30 is formed in annular weld pocket 18 and provides a weld surface for seal welding diaphragm 20 to platform 14. Seal weld 60, diaphragm 20 and weld bead 30 are materials which do not require post-weld-heat treatment by the applicable design code. Ring 24 extends from the bottom face of diaphragm 20 and engages with opening 16.

Flange cover 40 is positioned above diaphragm 20. Step 42 located in bottom surface of flange cover 40 engages with key 22.

Bores 50 formed in flange cover 40 are aligned with bores 50 formed in platform 14. Studs and nuts (not shown) extend through bores 50 to fasten flange cover 40 to flange 12.

In a preferred embodiment of the invention, diaphragm 20 is formed of Alloy 690 material.

In a further preferred embodiment of the invention, weld bead 30 and seal weld 60 is formed of P-43 weld metal. In another preferred embodiment of the invention, weld bead 30 is formed in accordance with Section III, Div. 1, NB-4622.11 of the ASME Code.

While a specific embodiment of the invention has been shown and described in detail to illustrate the application of the principles of the invention, it will be understood that the invention may be embodied otherwise without departing from such principles.

What is claimed is:

1. A diaphragm seal assembly comprising:
   a flange having a platform, the platform having an opening and an annular weld pocket around the opening;
   a diaphragm having a top face and a bottom face, the diaphragm resting on the platform;
   a ring extending from the bottom face of the diaphragm, the ring engaging with the opening;
   a weld bead formed in the annular weld pocket;
   a seal weld welding the diaphragm to the annular weld bead on the platform; and
   a flange cover fastened to the flange.

2. The diaphragm seal assembly according to claim 1 wherein the diaphragm is formed of Alloy 690.

3. The diaphragm seal assembly according to claim 1 wherein the annular weld bead and seal weld is formed of P-43 weld metal.

4. The diaphragm seal assembly according to claim 1 wherein the flange cover having a bottom surface, the bottom surface connected to the top face of the diaphragm, the bottom surface of the flange cover being offset from the platform.

5. The diaphragm seal assembly according to claim 4 wherein the bottom surface of the flange cover having a step, the top face of the diaphragm having a key, the key engaging with the step.

6. The diaphragm seal assembly according to claim 1 wherein the flange cover having a first plurality of bores, the platform having a second plurality of bores being aligned with the first plurality of bores, bolts extending through both plurality of bores, the bolts fastened by nuts.

7. A diaphragm seal assembly used in combination with a flange and a removable flange cover, the flange having an opening, the diaphragm seal assembly comprising:
   a diaphragm positioned between the flange and the flange cover, the diaphragm having a top surface and a bottom surface;

a ring extending from the bottom surface of the diaphragm, the ring engaging with the opening;

an annular weld pocket located on the flange;

a weld bead formed in the annular weld pocket; and a seal weld welding the diaphragm to the weld bead on the flange.

8. The diaphragm seal assembly according to claim 7 wherein the diaphragm is formed of Alloy 690.

9. The diaphragm seal assembly according to claim 7 wherein the annular weld bead and seal weld is formed of P-43 alloy.

10. The diaphragm seal assembly according to claim 7 wherein the annular weld bead is formed in accordance with Section III, Div. 1, NB-4622.11 of the ASME Code.

11. The diaphragm seal assembly according to claim 7 wherein the flange cover having a first plurality of bores, the flange having a second plurality of bores being aligned with the first plurality of bores, bolts extending through both plurality of bores, the bolts fastened by nuts.

12. A method for creating a diaphragm seal on a flange sealed by a gasket, the method comprising the following steps:

removing a flange cover from the flange;

removing the gasket;

machining an annular weld pocket on a top surface of the flange;

depositing a weld bead in the annular weld pocket;

resting a diaphragm on the top surface of the flange;

seal welding the diaphragm to the annular weld pocket; and fastening the flange cover to the flange.

13. The method in accordance with claim 12 wherein the weld bead is formed by a shielded metal arc welding process.

14. The method in accordance with claim 12 wherein the diaphragm is formed of Alloy 690.

15. The method in accordance with claim 12 wherein the annular weld bead and seal weld is formed of P-43 weld metal.

16. The method according to claim 12 wherein the weld bead is formed in accordance with Section III, Div. 1, NB-4622.11 of the ASME Code.

* * * * *